April 25, 1939.  F. C. BEST  2,155,750
MOTOR VEHICLE
Filed Aug. 9, 1933  2 Sheets—Sheet 1
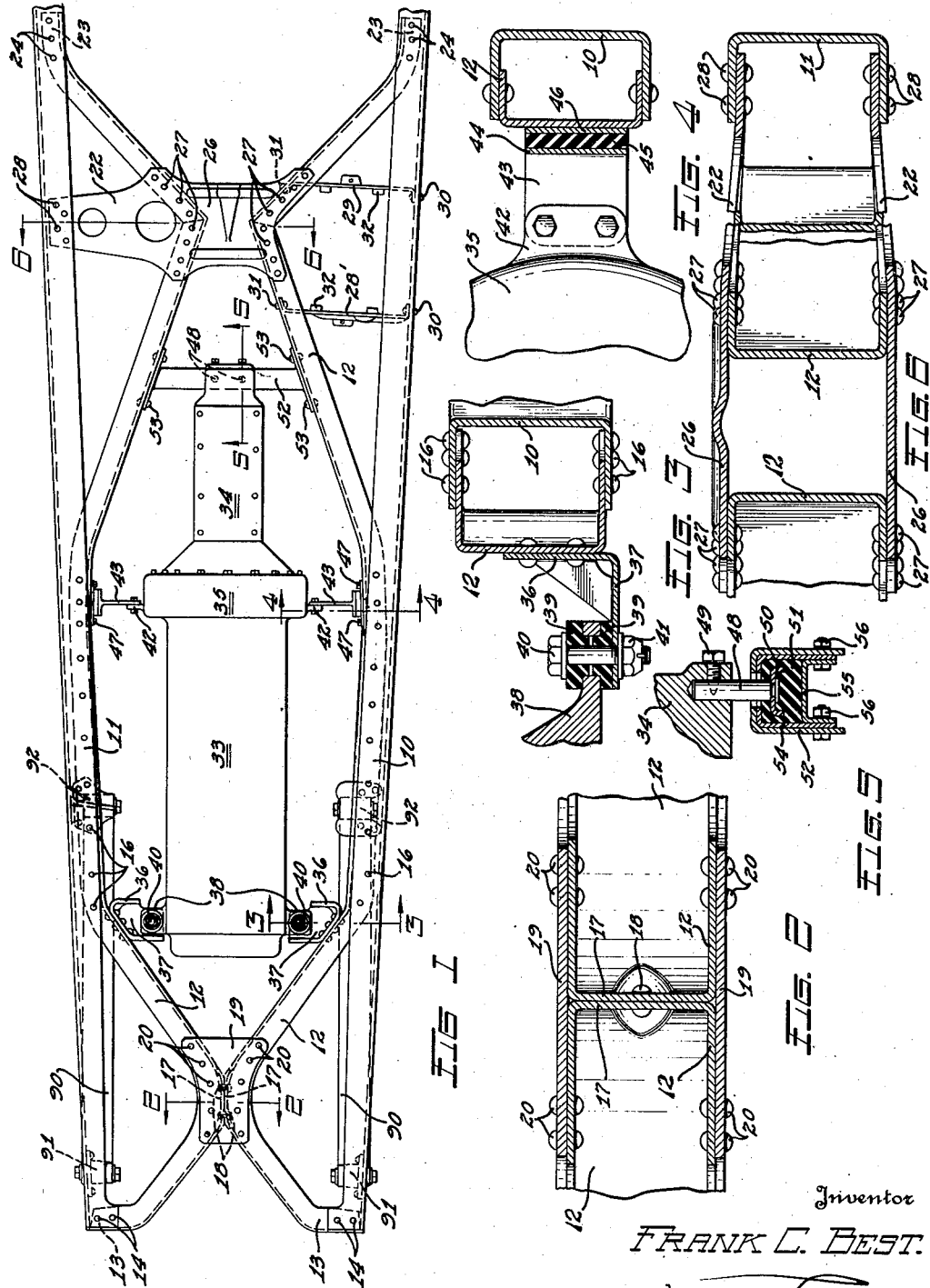
Inventor
FRANK C. BEST.
By Milton Tibbitts
Attorney April 25, 1939.　　　F. C. BEST　　　2,155,750
MOTOR VEHICLE
Filed Aug. 9, 1933　　　2 Sheets-Sheet 2
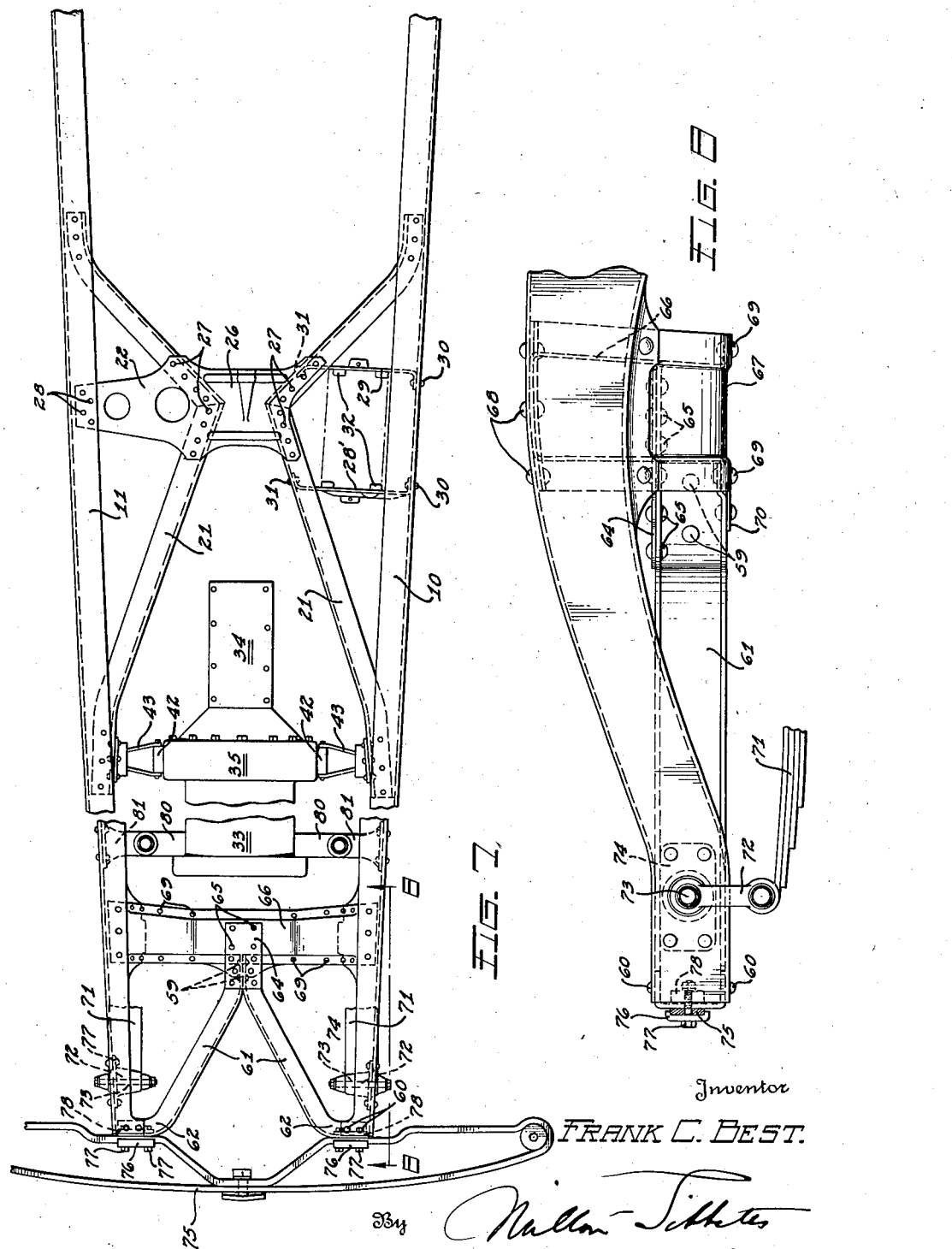

Patented Apr. 25, 1939

2,155,750

UNITED STATES PATENT OFFICE 2,155,750

MOTOR VEHICLE

Frank C. Best, Detroit, Mich., assignor to Packard Motor Car Company, Detroit, Mich., a corporation of Michigan Application August 9, 1933, Serial No. 684,349

8 Claims. (Cl. 280—106)

This invention relates to motor vehicles and more particularly to frame construction for motor vehicles.

Motor vehicle frames are subjected to several kinds of forces which tend to distort them laterally, longitudinally, vertically and torsionally. These forces are induced mainly by power plant vibrations and torque reactions, wheel movements including tramping, shimmy and normal vertical action, side sway and centrifugal action of parts of the vehicle.

These conditions have heretofore been recognized and various types of frame bracing means have been employed. Because of the excessive weight of bracing means required to provide a rigid frame, it is the custom in practical structures to use only enough bracing means permitted by the limits of safety, but such frames are flexible and therefore undesirable because they and the vehicles with which they are associated lack durability and the occupants of such vehicles are conscious of weaving motion resulting from the flexibility of the frames.

It is an object of this invention to provide a durable, light weight frame for motor vehicles which is braced so that flexibility under all operating conditions is substantially eliminated.

Another object of my invention is to provide an X-braced motor vehicle frame with means to prevent shearing stresses therein.

A further object of my invention is to provide a motor vehicle frame with bracing means which also serves as a support for the battery.

Still another object of the invention is to provide a motor vehicle frame having brace means for entirely supporting a power plant and associated accessories so that the load thereof is distributed upon the side sills of the frame rather than being localized, such as they would be if the side sills directly supported the power plant unit or a part thereof.

Another object of the invention is to provide diagonal bracing means at the forward end of a motor vehicle frame in order to add strength thereto.

Still another object of the invention is to provide a motor vehicle frame with an X-brace means at the forward end having the ends of the legs anchored to the frame proper and adjacent the anchoring points of longitudinally extending front spring structures so that frame bending due to the attachment of the spring structures will be substantially eliminated.

Other objects of the invention will appear from the following description taken in connection with the drawings, which form a part of this specification, and in which:

Fig. 1 is a plan view of a motor vehicle frame incorporating my invention and having a power unit supported thereby;

Fig. 2 is a fragmentary sectional view, taken on line 2—2 of Fig. 1, illustrating the connection of the elements constituting the front brace means for the frame;

Fig. 3 is a fragmentary sectional view, taken on line 3—3 of Fig. 1, illustrating one of the forward power unit mountings;

Fig. 4 is a sectional view taken on line 4—4 of Fig. 1, illustrating one of the intermediate power unit mountings;

Fig. 5 is a sectional view taken on line 5—5 of Fig. 1, illustrating one of the rear mountings for the power unit;

Fig. 6 is a sectional view taken on line 6—6 of Fig. 1, illustrating the shear resisting brace;

Fig. 7 is a plan view of a modified form of power unit supporting frame incorporating my invention;

Fig. 8 is a side elevational view, partly in section, taken on line 8—8 of Fig. 6;

Referring now to the drawings by characters of reference, 10 and 11 indicate a pair of spaced longitudinally extending sill members forming the sides of a motor vehicle main frame. Such members are preferably formed of channel steel having the flanges extending horizontally.

Between the sills I propose to associate brace structure, relatively light in weight, to provide a frame which is substantially rigid under all operating conditions. Such brace structure is designed to oppose the effort of all forces acting to distort the frame torsionally, laterally, vertically and longitudinally. Preferably, such brace structure is designed to provide two longitudinally disposed X-brace means which can consist mainly of two or more channel members, as will be hereinafter described.

The brace structure can be formed of two longitudinally extending members 12. The forward end portions of the members 12 are bent, as indicated at 13, to extend transversely of the frame sills and are secured to the forward ends thereof by suitable means, such as rivets 14. The central portion of the members 12 parallel the sills and are secured thereto by suitable means, such as rivets 16. Between the ends 13 and the portions parallel to the side sills secured by rivets 16, the members 12 are bent to form an angle and are arranged with the apex portions 17 extending longitudinally of the frame a short distance in abutting relation where they are secured together by rivets 18. The apex portions 17 of the members 12 are further secured together by a pair of plates 19 riveted to the top and bottom flanges thereof, as indicated at 20, it being understood that the brace elements 12 are of channel form and arranged with their open side facing the open side of the adjacent sill. This form of brace means adds rigidity to the forward end of the frame without the addition of weight as compared with a frame having the usual transverse braces. It will be seen that this type of forward brace means provides diagonally extending reinforcing means between the sills such that forces tending to move the sills relatively longitudinally, laterally, vertically and torsionally are opposed.

Adjacent the front ends of the sills the forward ends of longitudinally extending leaf springs 90 are pivotally mounted in the usual manner by shackle means, as indicated at 91, carried by the side sills. The rear ends of the front longitudinally extending springs 90 are anchored to the side sills by pivot means, as indicated at 92, such springs and mounting therefor being of a conventional design. The forward X-brace means is arranged so that the ends of its legs are attached to the side sills adjacent the pivotal mountings of the forward springs. In this manner, load imparted to the frame by means of the springs is transmitted substantially directly to the forward X-brace means so that the effects of such forces are absorbed substantially directly thereby.

Spaced longitudinally from the front X-brace means is another X-brace means which is formed by angular rear portions of the pair of members 12. The forward ends of such X-brace means are riveted, or otherwise secured, to the side sills and the rear ends 23 of such members are secured to the side sills by rivets 24. The apex portions of the two members forming this rear X-brace means are secured together in spaced relation by a pair of anchor plates 26 secured to the top and bottom flanges of the brace members by rivets 27. A brace member 22 extends transversely of the frame sills for the purpose of preventing longitudinal distortion of the rear brace means whereby shearing force upon the plates 26 will be opposed. Such means consists of members 22 which, in this instance, form a continuation of one side of the plates 26 and they are secured as by rivets 28 to the sill 11. Any relative longitudinal movement of those portions of the members 12 forming the rear brace means will thus be entirely resisted.

In order to give the frame further rigidity, I associate brace means between the rear X-brace means and the sill 10, such means in this instance being for the additional purpose of supporting the motor battery. To this end, a pair of spaced plates 28' and 29 are secured at one end by rivets 30 to the sill 10 and at the other end to the adjacent brace member 12 by rivets 31. Suitable lugs 32 are bent from the plates so that the battery can rest thereon when inserted between the plates.

The front and rear X-brace means provide the sole support for a power unit including a motor 33, a transmission 34 and an intermediate flywheel portion 35. The power unit is carried by mountings associated with opposite sides of each of the parts thereof mentioned. Near the end of each leg of the forward brace means is riveted a bracket 36 having an arm 37 over which a motor arm 38 extends. The arms are provided with an opening into which a pair of rubber ring members 39 extend and a bolt 40 projects through each pair of rubber members and the opening in the adjacent supporting arm. A nut 41 is associated with each bolt to secure the motor arm on its mounting.

An ear 42 projects from each side of the flywheel portion of the power unit and a transversely extending arm 43 is bolted to each ear. Fixed to the flange end 44 of each arm is a rubber member 45 which is also fixed to a plate 46. The rubber can be fastened to the plate and arm flange in a suitable manner, such as by vulcanization. The arms are secured to the adjacent brace means consisting of that portion of the members 12 forming the rear brace means.

Depending from the rear end of the transmission casing 34 are pins 48 which are secured against displacement by screw members 49. The lower end of the pins and retainers 50 associated therewith are enclosed in rubber blocks 51. A transversely extending supporting member 52 in the form of a channel extends across the forward legs of the rear bracing means and is secured thereto by rivets 53. The rubber blocks are housed by two members 54 and 55 which telescope in the support 52 and are secured thereto by bolts 56. The support 52 and the housing members 54 are formed with openings through which the pins 48 extend.

By supporting the entire power unit and the attached accessories entirely on the two X-brace means, the entire load thereof is distributed throughout the bracing means and is therefore not localized at any point on the side sills. The frame is designed so that the side sills directly support the vehicle body and thus engine vibrations and torque reactions are distributed by the brace means so that the frame is not flexed by localized load, thereby preventing such force reacting on the vehicle body. Under some circumstances it may be found desirable to eliminate a considerable part of that portion of each of the members 12 which parallels and is secured to the adjacent side sills. In other words, in such a construction the front and rear X-brace means will be separate, although each will preferably have portions paralleling and secured to the sills. Such an arrangement gives slightly less rigidity and strength than that shown in Figure 1 in which the members 12 are continuous over substantially the entire length of the vehicle, the vertical and lateral forces being resisted more adequately by reason of such continuity. However, the instant invention contemplates such a construction and it will be appreciated that with either form of bracing means, a rigid frame is provided so that there is substantially no flexibility as forces acting torsionally, vertically, laterally or longitudinally are effectively resisted.

In the modified form of frame shown in Figs. 7 and 8, there is a rear bracing means similar to that previously described wherein the brace members 21 are employed. At the forward end of the side sills 10 and 11, there is a K-brace means which includes a pair of diagonally extending channel members 61 terminating in transversely extending forward ends 62 fastened to the forward ends of the side sills by rivets 60. The members 61 angle rearwardly toward each other and extend in parallel relation longitudinally and centrally of the frame structure, being secured together by rivets as indicated at 59. Instead of the members 61 continuing to form an X-brace means, as shown in Figs. 1 to 6 inclusive, they terminate at their parallel ends and are fastened to a transversely extending structure by a plate 64 secured by rivets 65. The transverse brace structure comprises a top channel member 66 and a bottom plate member 67 which are co-extensive, the end portions being secured to the frame sills by rivets 68. The sills, in this instance, curve upwardly adjacent the front ends and the central portion of the transverse brace structure curves downwardly from the sills so that the members 61 can be secured thereto while extending in a horizontal plane. The front and rear edge portions of the members 66 and 67 are flanged outwardly and secured together by rivets 69, a central portion of the front edge of the member 67 being extended to form a support for the rear ends of the members 61.

Longitudinally extending leaf springs 71 are carried at their forward ends by shackles 72 which pivot on pins 73 extending through the frame sills supported by brackets 74 fixed to the sills. In this respect, the spring is mounted in the same manner as in the previously described embodiment of the invention.

The diagonally disposed brace means at the forward end of the frame having transversely extending ends 62 provides a two-point support for a front bumper which has the advantage of transmitting any blows on the end of the bumper diagonally of the frame so that such forces will not be localized, as they are when diagonal members are not present in the frame construction. A bumper 75 extends across the front of the vehicle frame and is secured to the ends 62 or 13 of the front brace means, in either modification illustrated, by means of a plate 76 and bolts 77 extending through the plate, the bumper and the transversely extending front ends of the forward brace member, there being plates 78 welded or otherwise secured to the inner face of the transversely extending ends of the front brace member to which the bolts can extend in order to provide a more rigid securement. In the modified form of frame, only the rear end of the power unit is carried by the brace construction, the forward end thereof being carried by arms 80 extending from the motor and resiliently mounted on arms 81 fixed to the side sills, the arms 80 and 81 forming structure extending transversely of the frame.

It will be noted that in the two distinct embodiments of the invention illustrated in the drawings in Figures 1 and 7, the frame structure rearward of the power unit is identical. Similar reference characters have accordingly been employed to designate the corresponding parts.

The vehicle frame herein described, because of the brace means, has the advantage of rigidity without the disadvantage of weight.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a motor vehicle, the combination with a pair of longitudinally extending frame sills, of brace means between the forward ends of the sills comprising a pair of members having transversely extending forward ends secured to the forward ends of the side sills, longitudinally extending portions secured together, and intermediate portions extending diagonally in opposite directions, and means connecting said longitudinally extending portions with said side sills.

2. In a motor vehicle, the combination with a pair of longitudinally extending frame sills, of a transversely extending brace member secured between forward portions of the sills, and a pair of brace members intermediate the forward ends of the sills extending in opposite diagonal directions, said pair of brace members being secured together and to the transverse brace member at their rear ends and secured at their forward ends to the extreme forward ends of the sills.

3. In a motor vehicle, the combination with a pair of longitudinally extending frame sills curving upwardly at their forward end, of a transversely extending brace means secured between the sills near the forward ends thereof, said transverse brace means having a portion extending below the sills in a horizontal plane with the forward ends thereof, and a pair of brace members extending in opposite diagonal directions with their rear ends secured to the depending portion of the transverse brace means and their forward ends secured to the forward ends of the sills.

4. In a motor vehicle, the combination with a pair of longitudinally extending frame sills, of a pair of angular brace members extending longitudinally between and secured rigidly to the sills, and torsion resisting brace means securing an intermediate portion of the brace members together and to one of the sills.

5. In a motor vehicle, the combination with a pair of longitudinally extending frame sills, of a pair of angular brace members extending longitudinally between the sills and having their ends secured rigidly thereto, and a torsion resisting brace means secured to the apex portion of the angular brace members and fixed to one of the sills.

6. In a motor vehicle, the combination of a frame having a pair of X-brace means spaced longitudinally, mounting means on the rear legs of the front X-brace means, a pair of longitudinally spaced mounting means on the front legs of the rear X-brace means, and a power unit carried on said mounting means.

7. A motor vehicle frame comprising spaced side sill members, an X-brace means between and secured rigidly at the ends to the sill members, and a pair of superposed plates secured at one end to the junction of the X-brace means and at the other end to one of the sill members, said plates opposing shearing forces.

8. A motor vehicle frame comprising spaced side sill members, an X-brace means between and secured rigidly at the ends to the sill members, and means connected between the junction of the X-brace means and at the other end to one of the sill members, said last named means opposing shearing forces.

FRANK C. BEST.